United States Patent
Good et al.

(10) Patent No.: US 10,867,711 B2
(45) Date of Patent: Dec. 15, 2020

(54) PRESSURE BOUNDARY BOLTED ANTI-EJECTION DEVICE

(71) Applicant: WESTINGHOUSE ELECTRIC COMPANY LLC, Cranberry Township, PA (US)

(72) Inventors: Brandon F. Good, Monroeville, PA (US); Geoffrey M. Loy, Pittsburgh, PA (US); William C. Castillo, Gibsonia, PA (US); Paul J. Kreitman, Libertyville, IL (US); Tony J. Mastopietro, Wauwatosa, WI (US); Mark M. Pillard, Gurnee, IL (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 259 days.

(21) Appl. No.: 15/814,622

(22) Filed: Nov. 16, 2017

(65) Prior Publication Data
US 2018/0151263 A1 May 31, 2018

Related U.S. Application Data

(60) Provisional application No. 62/426,742, filed on Nov. 28, 2016, provisional application No. 62/482,434, filed on Apr. 6, 2017.

(51) Int. Cl.
*G21C 13/067* (2006.01)
*G21C 19/20* (2006.01)
*G21C 13/036* (2006.01)

(52) U.S. Cl.
CPC ....... *G21C 13/0675* (2013.01); *G21C 13/036* (2013.01); *G21C 19/207* (2013.01); *G21C 13/067* (2013.01); *Y02E 30/30* (2013.01)

(58) Field of Classification Search
CPC .............. G21C 13/067; G21C 13/0675; G21C 13/036; G21C 19/207
See application file for complete search history.

(56) References Cited

U.S. PATENT DOCUMENTS

| 4,044,622 | A | * | 8/1977 | Matthews | ................ G21C 7/12 74/424.95 |
| 4,576,780 | A | * | 3/1986 | Belz | ......................... G21C 7/12 376/235 |
| 4,646,816 | A | * | 3/1987 | Rothstein | ................ F16L 55/13 138/89 |

(Continued)

OTHER PUBLICATIONS

International Search Report and Written Opinion of the International Searching Authority dated Apr. 2, 2018 for PCT/US2017/061921 (Forms PCT/ISA/220, PCT/ISA/210, PCT/ISA/237).

*Primary Examiner* — Lily C Garner
(74) *Attorney, Agent, or Firm* — K&L Gates LLP

(57) ABSTRACT

A device is provided for use in securing a remnant of a tube through a wall of a pressure vessel. The device include an anti-ejection device for attachment to the remnant on an interior side of the pressure vessel and an end cap for attachment to the remnant on an exterior side of the pressure vessel for sealing an open end of the remnant. The anti-ejection device includes an anti-rotation member for constraining the remnant and the anti-ejection device against relative rotation therebetween. A bolt connects the anti-ejection device, the remnant, and the end cap.

18 Claims, 13 Drawing Sheets

(56) References Cited

U.S. PATENT DOCUMENTS

| | | | | |
|---|---|---|---|---|
| 4,652,418 A | * | 3/1987 | Baric | G21C 13/067 376/204 |
| 4,769,207 A | * | 9/1988 | Weber | F16L 55/132 138/89 |
| 5,295,165 A | * | 3/1994 | Hankinson | G21C 13/067 376/203 |
| 5,297,187 A | * | 3/1994 | Sodergren | F16L 55/136 376/203 |
| 5,421,369 A | * | 6/1995 | Wivagg | G21C 13/028 138/89 |
| 5,456,290 A | * | 10/1995 | Haberman | F16L 55/13 138/89 |
| 5,605,361 A | * | 2/1997 | Sims | F16L 41/08 285/206 |
| 5,675,618 A | * | 10/1997 | Amburn | G21C 1/09 376/203 |
| 5,715,598 A | * | 2/1998 | Everett | F28F 11/02 29/523 |
| 2013/0209318 A1 | * | 8/2013 | Garland | B01J 8/062 422/162 |

* cited by examiner

PRESSURE BOUNDARY BOLTED ANTI-EJECTION DEVICE

BACKGROUND OF THE INVENTION

1. Field of the Invention

The present invention relates to anti-ejection devices for penetration features in pressure vessels.

2. Description of the Prior Art

In pressure vessels, monitoring the conditions, such as pressure, temperature, or the levels of various gases, inside the vessel is often necessary. In certain vessels, ports are provided through the vessel walls into which monitoring instrumentation may be inserted. For example, in a nuclear reactor, instrument tubes may penetrate the underside of the reactor vessel for insertion, for example, of a probe to monitor neutron flux. Since pressures in a nuclear reactor can be about 2,500 psi, in the event of a rupture, ejection of the penetration tube with that degree of force behind it can create a dangerous condition. Therefore, penetration tubes are also typically provided with some form of an anti-ejection feature to prevent the tube from being ejected from the highly pressurized vessel in the event of a rupture in the vessel or a failure of the weld at the juncture of the vessel wall and the penetration tube.

It is sometimes necessary to remove a penetration tube. Under those circumstances, the anti-ejection feature is also removed, leaving the pressure vessel vulnerable to rupture if the hole through which the penetration tube passed is not sealed. To address the problem of residual holes or weakened vessel walls, it is often necessary to leave a remnant of the original penetration tube in place at the pressure boundary of the vessel wall. Leaving the remnant in place solves one problem, but creates another because the remnant may still become a dangerous projectile in the event of a vessel rupture.

SUMMARY OF THE INVENTION

The problem associated with preventing ejection of remnant penetration tubes in pressure vessels is addressed by the anti-ejection device described herein. A device is provided for use in securing a remnant of a tube through a wall of a pressure vessel. In various aspects, the device may include an anti-ejection device for attachment to the remnant on an interior side of the pressure vessel and an end cap for attachment to the remnant on an exterior side of the pressure vessel for sealing an open end of the remnant.

The anti-ejection device may further include an anti-rotation member for constraining the remnant and the anti-ejection device against relative rotation therebetween.

The device may also include a connector for connecting the anti-ejection device, the remnant, and the end cap.

In various aspects, the anti-ejection device defines a lumen passing axially therethrough and the remnant defines a lumen passing axially therethrough. The lumen of the anti-ejection device is preferably configured for axial alignment with the lumen in the remnant when, in use, the anti-ejection device is attached to the remnant. The end cap includes in various aspects, an inner threaded channel axially aligned in use with the lumens of the anti-ejection device and the remnant. The connector may comprise an elongate member for passage through the lumens of the anti-ejection device and the remnant, and a threaded end for threaded connection to the channel of the end cap.

The elongate member may be a bolt having an upper head portion, a mid-shank portion and a lower threaded end portion, the head portion being greater in cross-sectional dimension than the cross-sectional dimension of the shank portion.

The anti-ejection device may include an upper end and a lower end and the anti-rotation member may, in certain aspects be a first mating surface, and the remnant, which has an upper end in the interior of the pressure vessel, may have in certain aspects, a second mating surface formed in the upper end for complementary mating relationship with the first mating surface on the lower end of the collar.

The first mating surface may, in certain aspects, comprise a key extending from the lower end of the anti-ejection device, and the second mating surface may, in certain aspects, comprise a notch formed in the upper end of the remnant for complementary mating relationship with the key or a tooth-like structure. Alternatively, the first mating surface may comprise a notch formed in the lower end of the anti-ejection device, and the second mating surface may comprises a key or a tooth-like structure, extending from the upper end of the remnant for complementary mating relationship with the notch.

The lumen of the anti-ejection device may, in various aspects define an upper recessed section and a lower lumen section, the upper section being greater in cross-sectional dimension that the cross-sectional dimension of the lower lumen section, the upper section defining a rim surface for seating the head portion of the bolt.

In certain aspects, the anti-ejection device may have a uniformly dimensioned lumen and may have an upper section defining a rim surface for seating the head portion of the bolt.

BRIEF DESCRIPTION OF THE DRAWINGS

The characteristics and advantages of the present disclosure may be better understood by reference to the accompanying figures.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
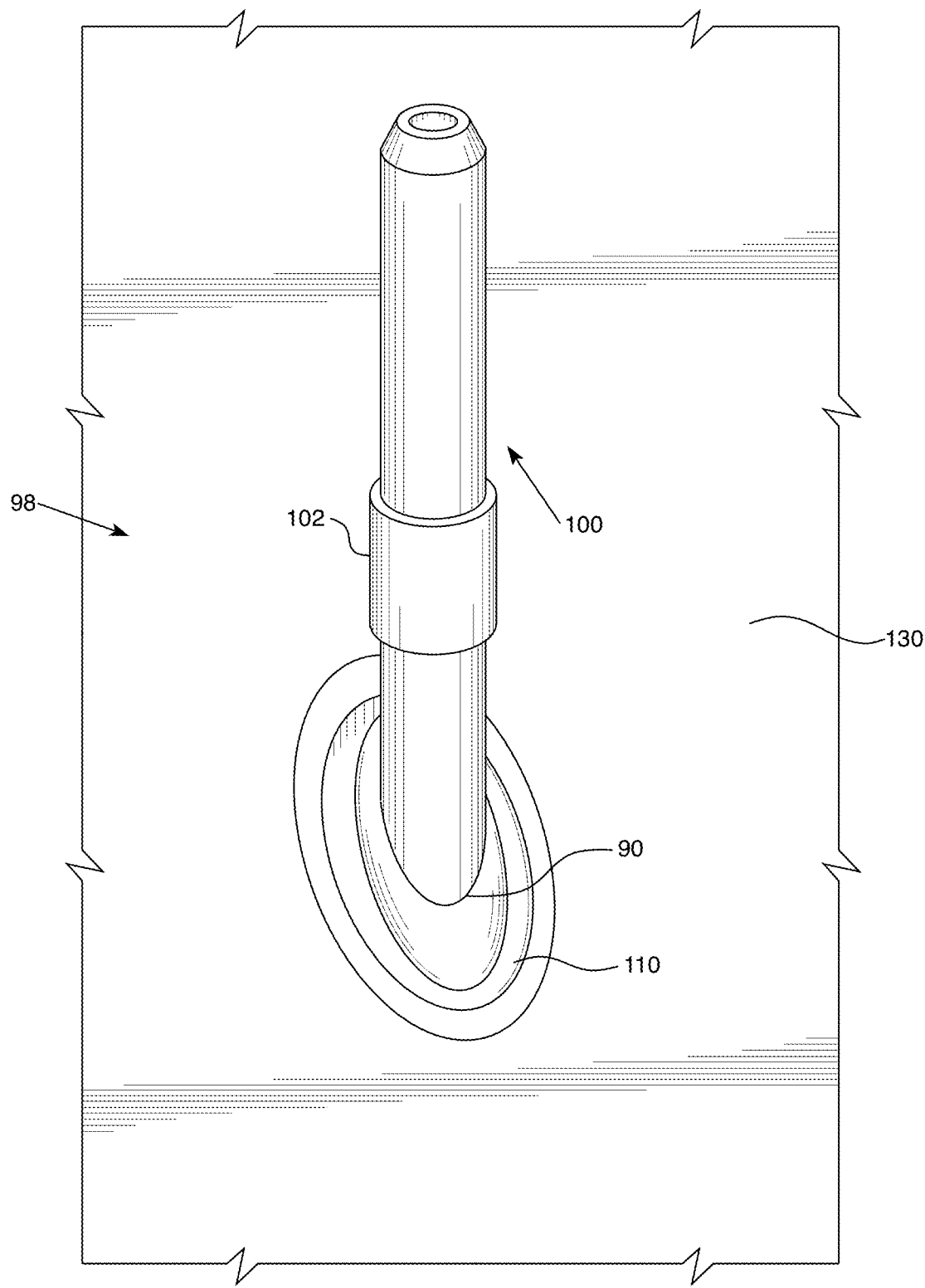
FIG. 1 is a perspective view of an instrument tube penetrating the interior of a pressure vessel.
Figure 2:
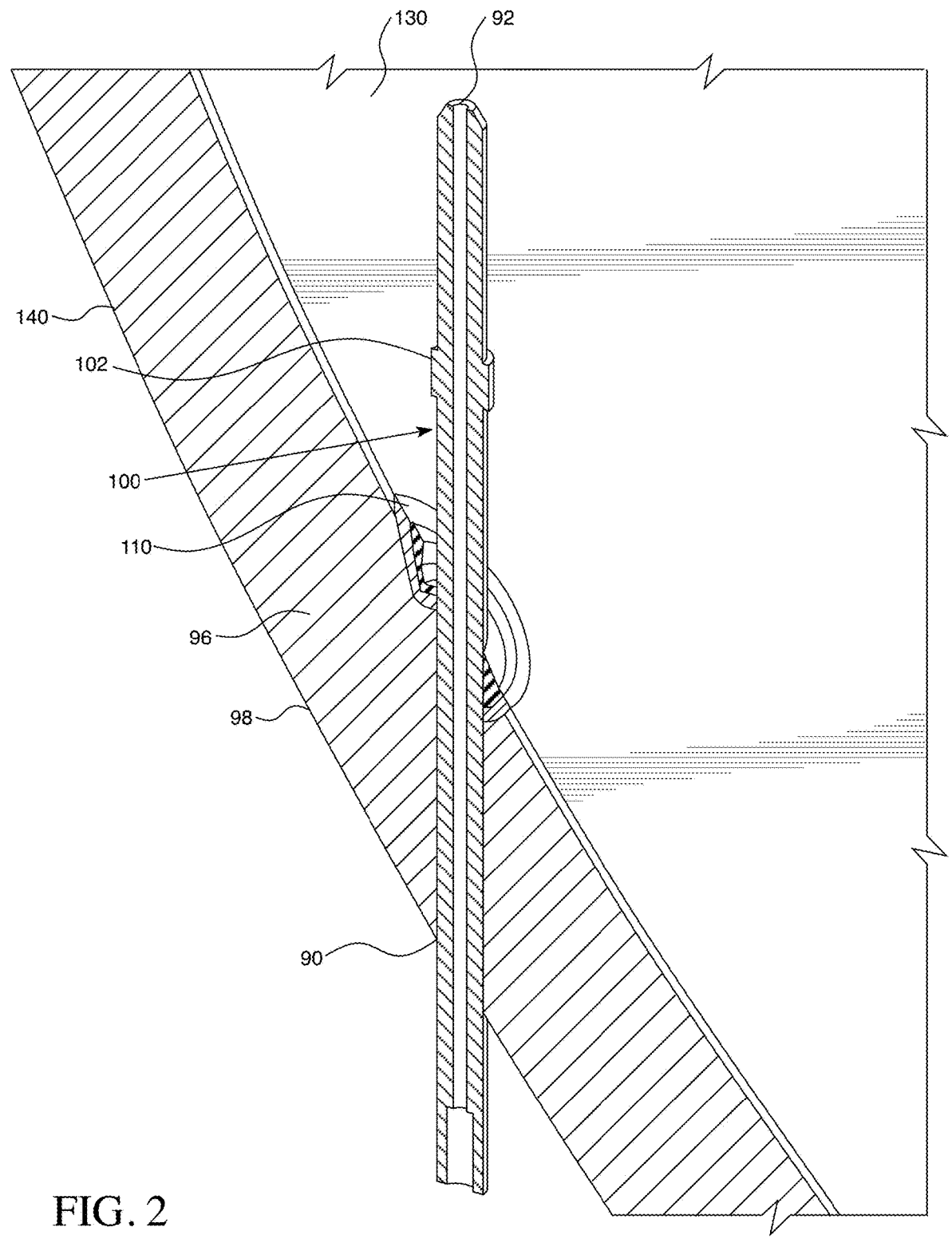
FIG. 2 is a section view of the instrument tube of FIG. 1 showing the tube passing through the pressure vessel wall.

FIG. 1 illustrates the interior 130 of a pressure vessel 98 with an instrument tube 100 passing through a hole 90 in the vessel 98. The area 110 around the instrument tube 100 and the vessel wall 96 is sealed by welding. FIG. 2 illustrates the instrument tube 100 extending through the hole 90 in the pressure vessel 98 from the exterior 140 to the interior 130. A lumen 92 through the instrument tube 100 allows passage of testing probes (not shown). The tube 100 is wider in diameter at a portion 102 of the tube 100 above the weld area 110 on the interior 130 of the vessel. This wider diameter portion 102 serves as an anti-ejection stop for the tube to prevent its becoming a projectile in the event of a pressure rupture in the vessel.

When the original instrument tube 100 is incapacitated by removal of part of the tube, the original anti-ejection stop portion 102 is removed, leaving a tube remnant 120. Described herein is an anti-ejection device 10 and sealing end cap 60 for retrofitting remnants 120 of instrument or other tubes in a pressure vessel 98.

Figure 3:
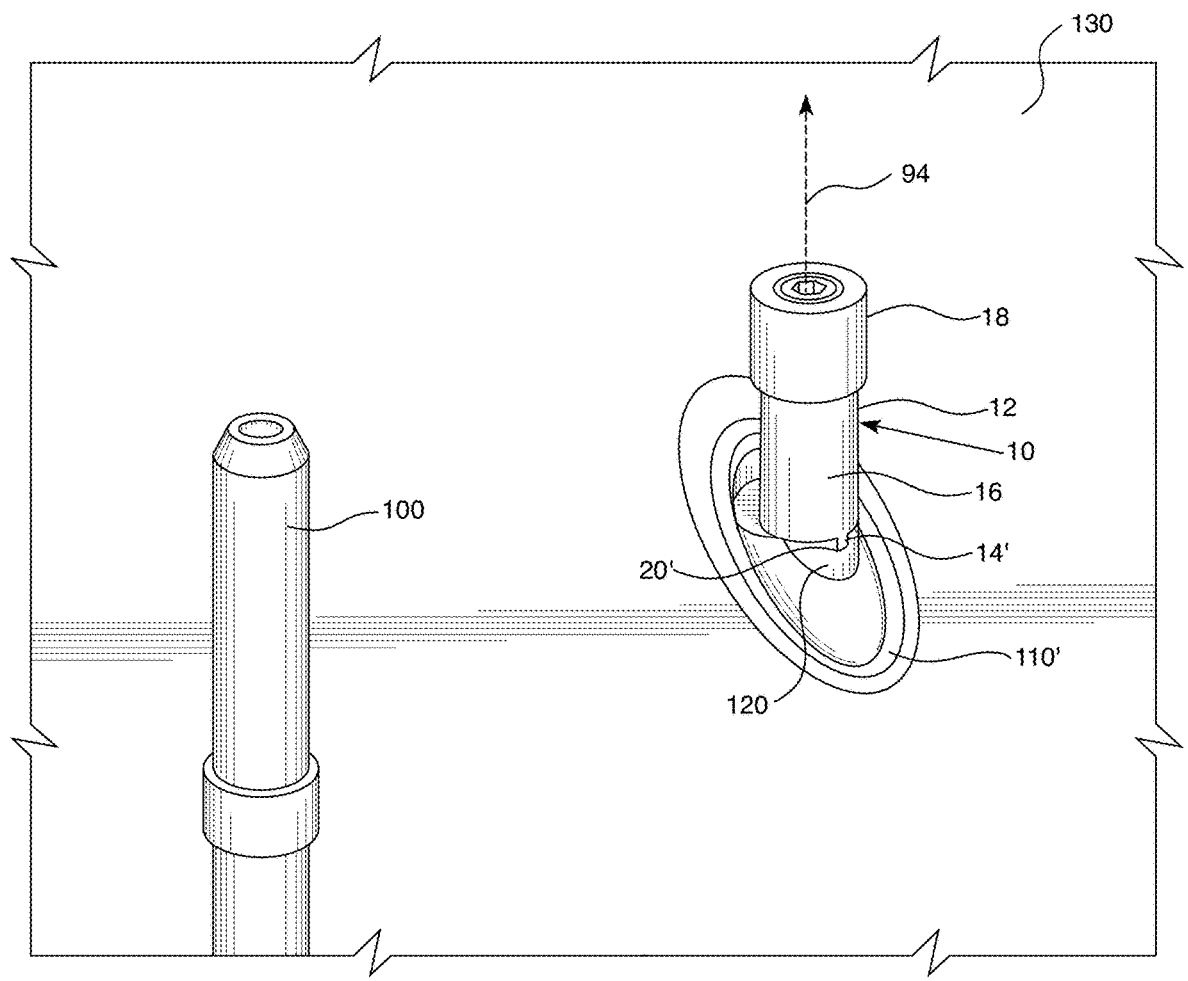
FIG. 3 is a perspective view of an embodiment of an anti-ejection device, showing the portion of the device on the interior of a pressure vessel.
Figure 4:
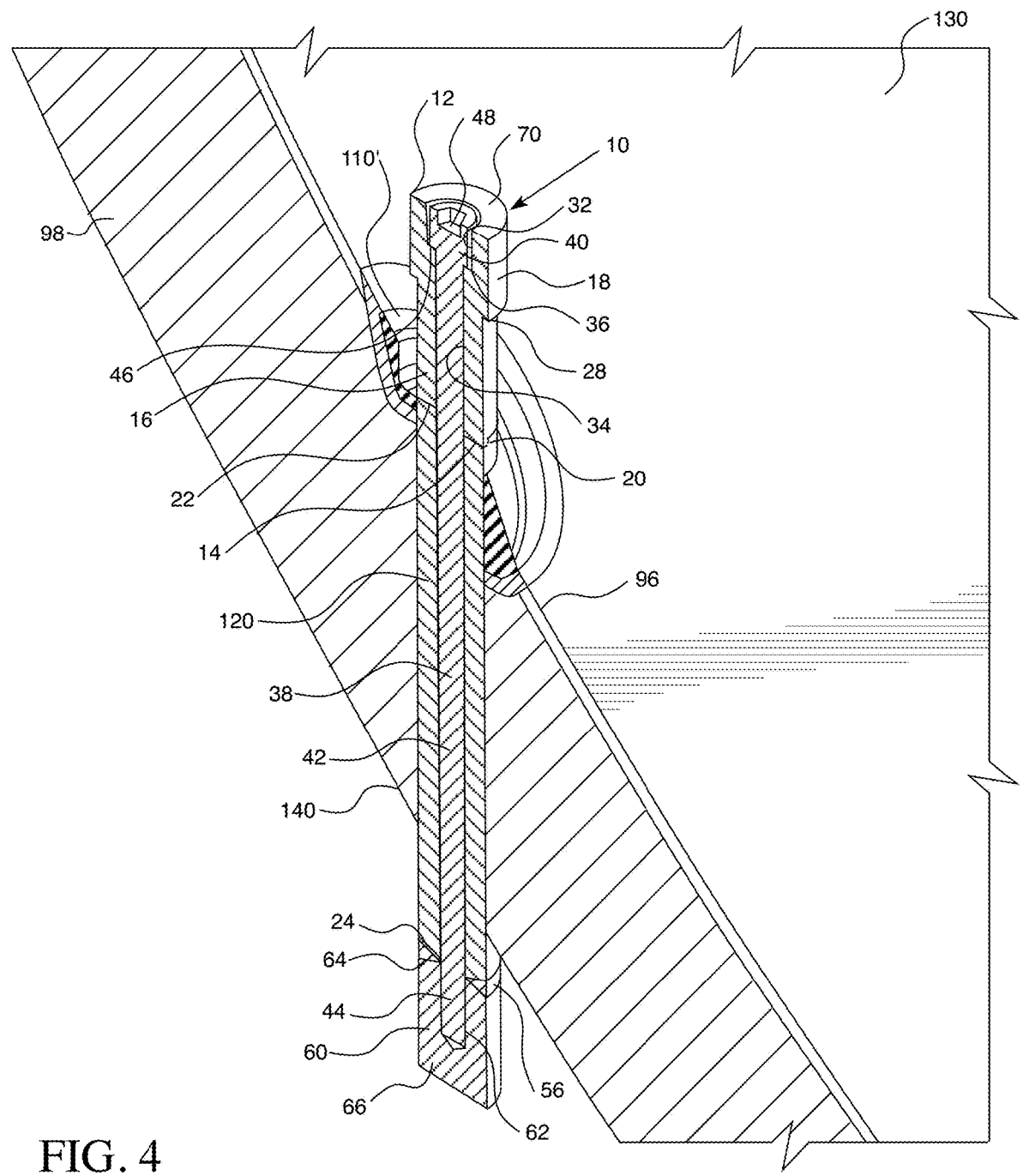
FIG. 4 is a section view of the embodiment of the anti-ejection device of FIG. 3 showing the device passing through the pressure vessel.

Referring to FIGS. 3 and 4, an embodiment of an anti-ejection device 10 and sealing cap 60 are shown connected to the top surface 22 and bottom surface 24, respectively, of a remnant 120. The remnant 120 extends through a hole 90 in the vessel wall 96 with a portion in the interior 130 and a portion on the exterior 140 of the pressure vessel 98.

Figure 5:
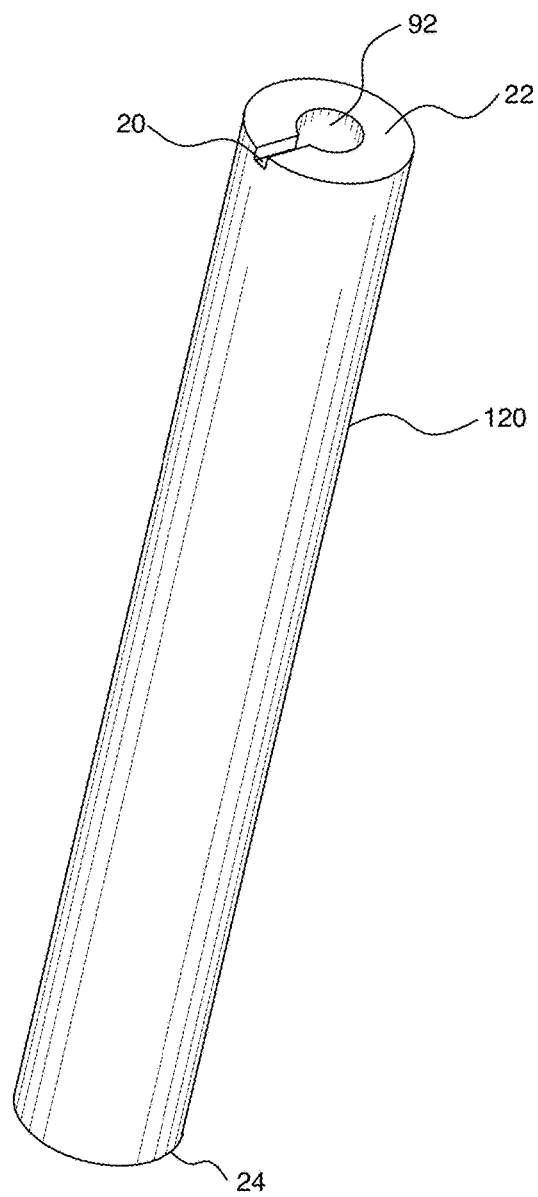
FIG. 5 illustrates an embodiment of a remnant of an original instrument tube that may remain after removal of the interior and exterior ends of the tube.

The remnant 120, as shown in FIG. 5, formed from the remaining portion of instrument tube 100 when it is partially removed, includes a bottom surface 24, a top surface 22 and retains the lumen 92 from instrument tube 100. A notch 20 or a key 14' is cut into top rim surface 22.

Figure 6:
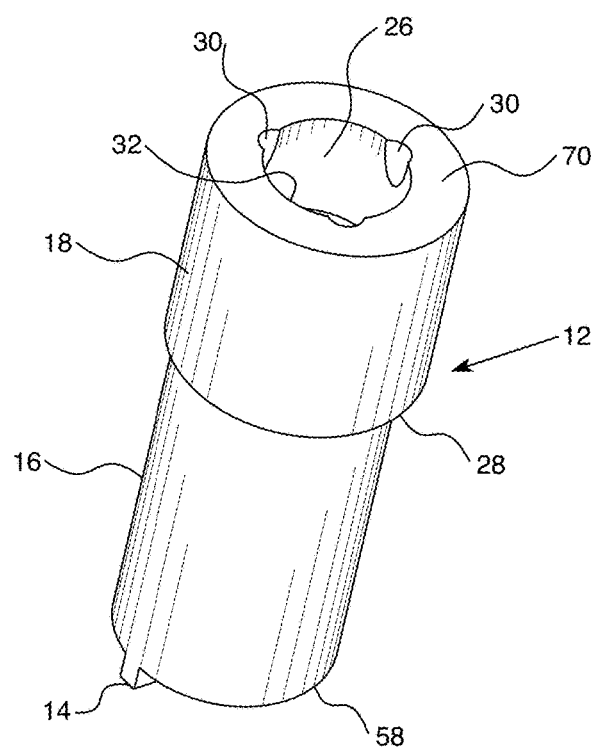
FIG. 6 illustrates the anti-ejection collar of the anti-ejection device of FIGS. 3 and 4.

Referring to FIG. 6, in various aspects, an anti-ejection device 10 may include a collar 12 having a lower neck portion 16 and an upper head portion 18, the cross-sectional dimension (e.g., diameter if the upper head portion is circular in cross-section) of which is greater than the cross-sectional dimension (e.g., diameter if the neck is circular in cross-section) of the neck portion 16. The transition from neck portion 16 to head portion 18 forms an under surface 28 that would function as an anti-ejection stop to prevent the collar 12 and remnant 120 from being ejected from the pressure vessel 98 in the event of a rupture. Collar 12 also includes a bottom rim surface at lower end 58. An anti-rotational member may be formed on the bottom rim surface. In various aspects, the anti-rotational member may be a first mating surface.

The remnant 120 may have in certain aspects, a second mating surface formed in the upper end 22 for complementary mating relationship with the first mating surface on the lower end 58 of the collar 12.

Figure 3A:
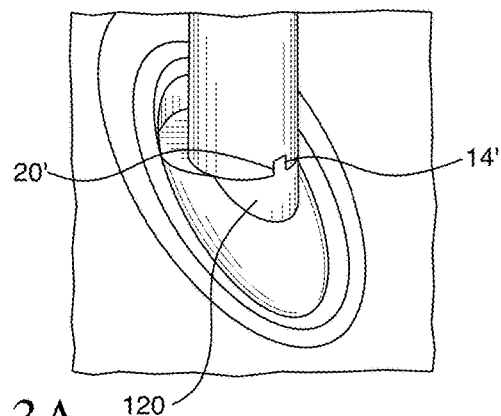
FIG. 3A is a detail view of an alternative embodiment of anti-rotation members in the area circled in FIG. 3.

The first mating surface may, in certain aspects, comprise a key 14 extending from the lower end 58 of the collar 12, and the second mating surface may, in certain aspects, comprise a notch 20 formed in the upper end 22 of the remnant 120 for complementary mating relationship with the key 14. Alternatively, the first mating surface may comprise a notch 20' (FIG. 3A inset) formed in the lower end 58 of the collar 12, and the second mating surface may comprises a key 14' extending from the upper end 22 of the remnant 120 for complementary mating relationship with the notch 20'.

A lumen 26 extends through collar 12. Referring to FIGS. 4 and 6, in various aspects, a lumen 26 includes an upper recessed portion 32 and a lower lumen section 34. Upper recess 32 is larger in cross-sectional dimension (e.g., diameter if circular in cross-section) than the cross-sectional dimension of the lower lumen 34 (e.g., diameter if circular in cross-section). The transition between the upper recess and lower lumen section 32, 34 defines a shoulder portion 36. A plurality of notches 30 are cut into the upper portion 32 along the top rim surface 70 of collar 12 for entry of a tool.

When collar 12 is seated on the top rim surface 22 of remnant 120, anti-rotation key 14, 14' is received in or seats in notch 20, 20' to constrain collar 12 and remnant 120 against relative rotation about their common longitudinal axis 94. Remnant 120 may be re-welded into position in area 110' about the hole 90 through the vessel wall 96. Collar 12 is in various aspects, removable to permit in-service inspections of the pressure vessel 98. In certain aspects, the collar 12 may be welded in position in area 110'.

Figure 7:
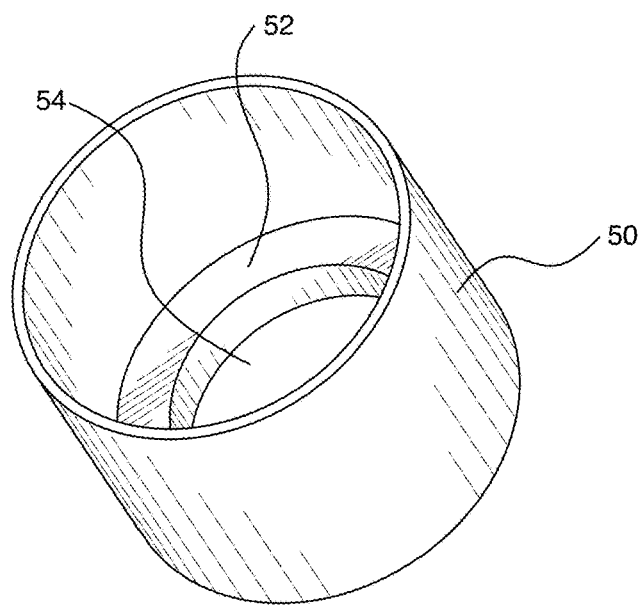
FIG. 7 illustrates the locking cup to be seated in the recess of the collar of FIG. 6.

An optional locking cup 50, shown in FIG. 7, having an open bottom surface 54 with a rim 52 may be provided to sit in recess 32 of collar 12 and rest on shoulder portion 36.

Figure 8:
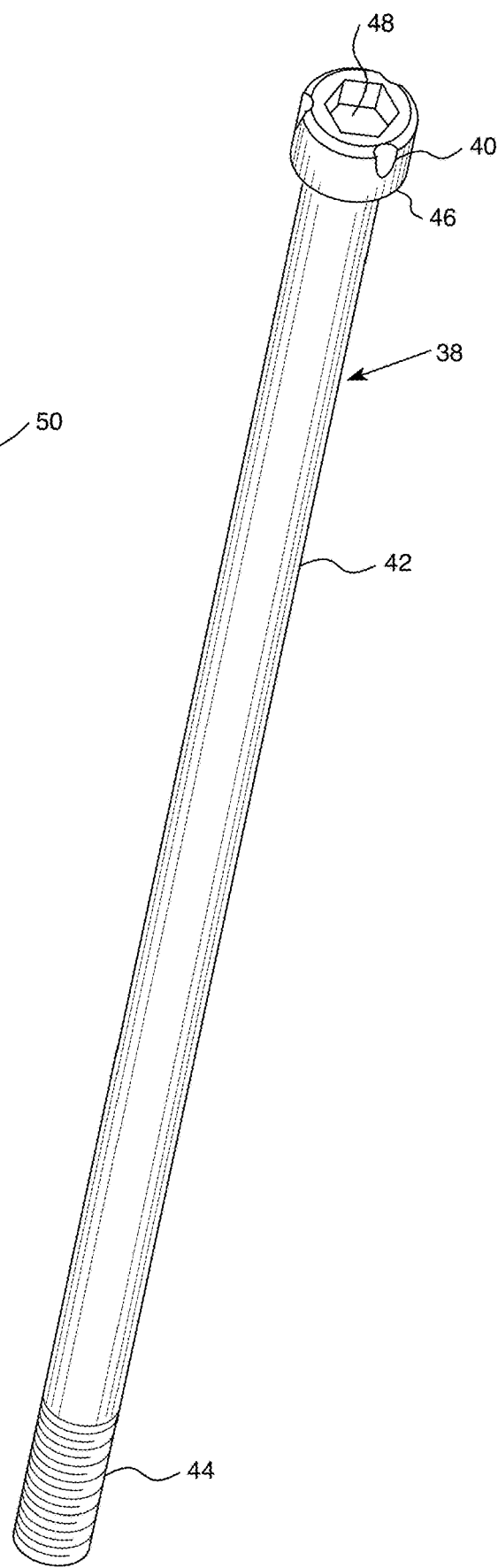
FIG. 8 illustrates an embodiment of a bolt that passes through the lumen of the collar and instrument tube remnant shown in FIGS. 4 and 11.

Referring to FIG. 8, a connector, such as a bolt 38 having a shank 42 and a head 40, is provided for insertion in use into lumens 26 and 92 of collar 12 and remnant 120, respectively, through open bottom surface 54 of locking cup 50. In various aspects, bolt head 40 is greater in diameter than bolt shank 42. The transition between shank 42 and head 40 forms an under surface 46 that seats on rim 52 of locking cup 50 and both are supported by shoulder portion 36 of upper lumen 32 in collar 12. Locking cup 50 prevents the connector from backing out. While shown as a flat surface, those skilled in the art will recognize that the mating surfaces of bolt head 40 and recess 32 of collar 12 may be beveled, sloped or any mating contoured complementary surfaces. Bolt head 40 may also include a recess 48 in its top surface for receiving a tool for inserting bolt 38 into the lumens 26 and 92, respectively, of collar 12 and remnant 120. Recess 48 may be contoured to receive any suitable complementary shaped tool, such as a wrench, hex screw, drill, or other driving tool to insert bolt 38 through collar 12 and remnant 120.

Figure 9:
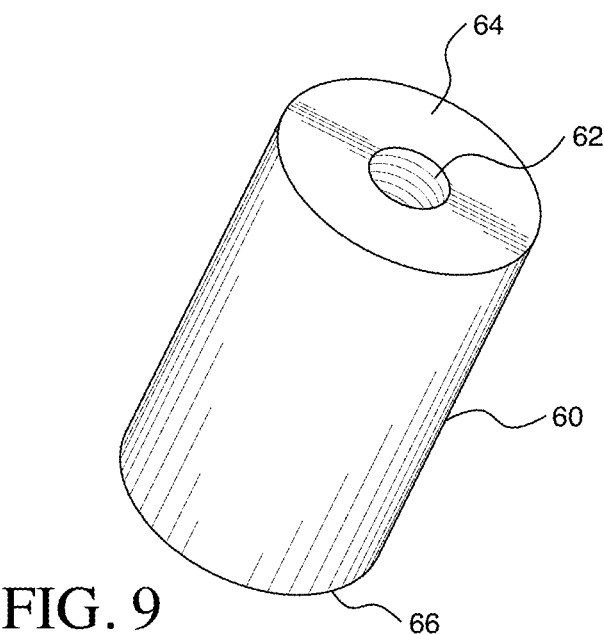
FIG. 9 illustrates an embodiment of a threaded end cap for securing the exterior portion of the remnant shown in FIG. 4.
Figure 10:
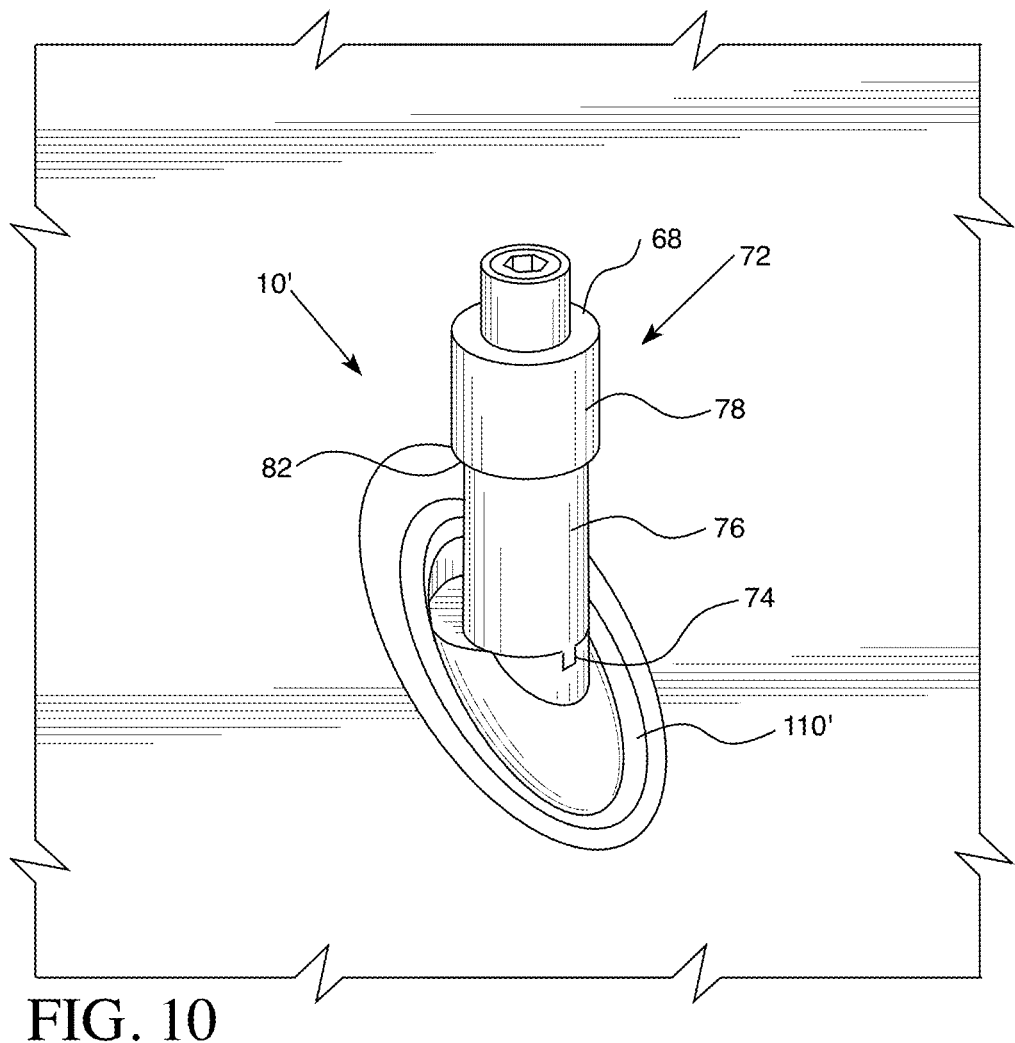
FIG. 10 is a perspective view of an alternative embodiment of an anti-ejection device, showing the portion of the device on the interior of a pressure vessel.

To secure the exterior end of remnant 120 on the exterior 140 of the pressure vessel 98, an end cap 60 may be provided. End cap 60, shown in FIGS. 4 and 9, may, in various aspects, include a top surface 64, a closed end bottom surface 66 and a threaded channel 62. Bolt 38 includes a threaded portion 44 at the bottom end of shank 42. The threaded channel 62 of end cap 60 is threaded in use onto the threaded end portion 44 of bolt 38. The closed end bottom surface 66 of end cap 60 seals lumen 92 of remnant 120 and thereby the hole 90 in the vessel wall 96. To further secure the end cap 60 to the lower end 24 of remnant 120, the top surface 64 of end cap 60 may be welded in weld zone 56 to the lower end 24 of remnant 120. The surfaces 64 and 24 may be relatively flat as shown in FIGS. 5 and 9, or may be beveled or sloped, as shown in FIG. 4. Those skilled in the art will recognize that the surfaces 64 and 24 may be any suitable complementary mating contour to ensure a sealed and locked remnant 120.

An alternative embodiment of anti-ejection device 10' is shown in FIGS. 10-13. Anti-ejection device 10' may include, in various aspects, a collar 72 having a head 78, a neck 76, an upper rim surface 68, a lower surface 84 and an anti-rotation member formed therein, either as a projection, such as key 74 extending downwardly from surface 84, or as a notch formed into the surface 84 (similar to notch 20' shown in FIG. 3A). Those skilled in the art will recognize that any complementary mating surfaces may suffice as anti-rotational mating surfaces. The diameter of head 78 is greater than the diameter of neck 76. The transition between the head 78 and neck 76 defines an under surface 82 that would function as an anti-ejection stop to prevent the collar 72 and remnant 120 from being ejected from the pressure vessel 98 in the event of a rupture. Remnant 120 is welded in place in weld zone 110' to seal the hole 90 through the vessel wall 96 and to secure remnant 120 in position in the interior 130 of the vessel. Collar 72 is optionally removable for inspection. Alternatively, collar 72 may also be welded in position.

Figure 11:
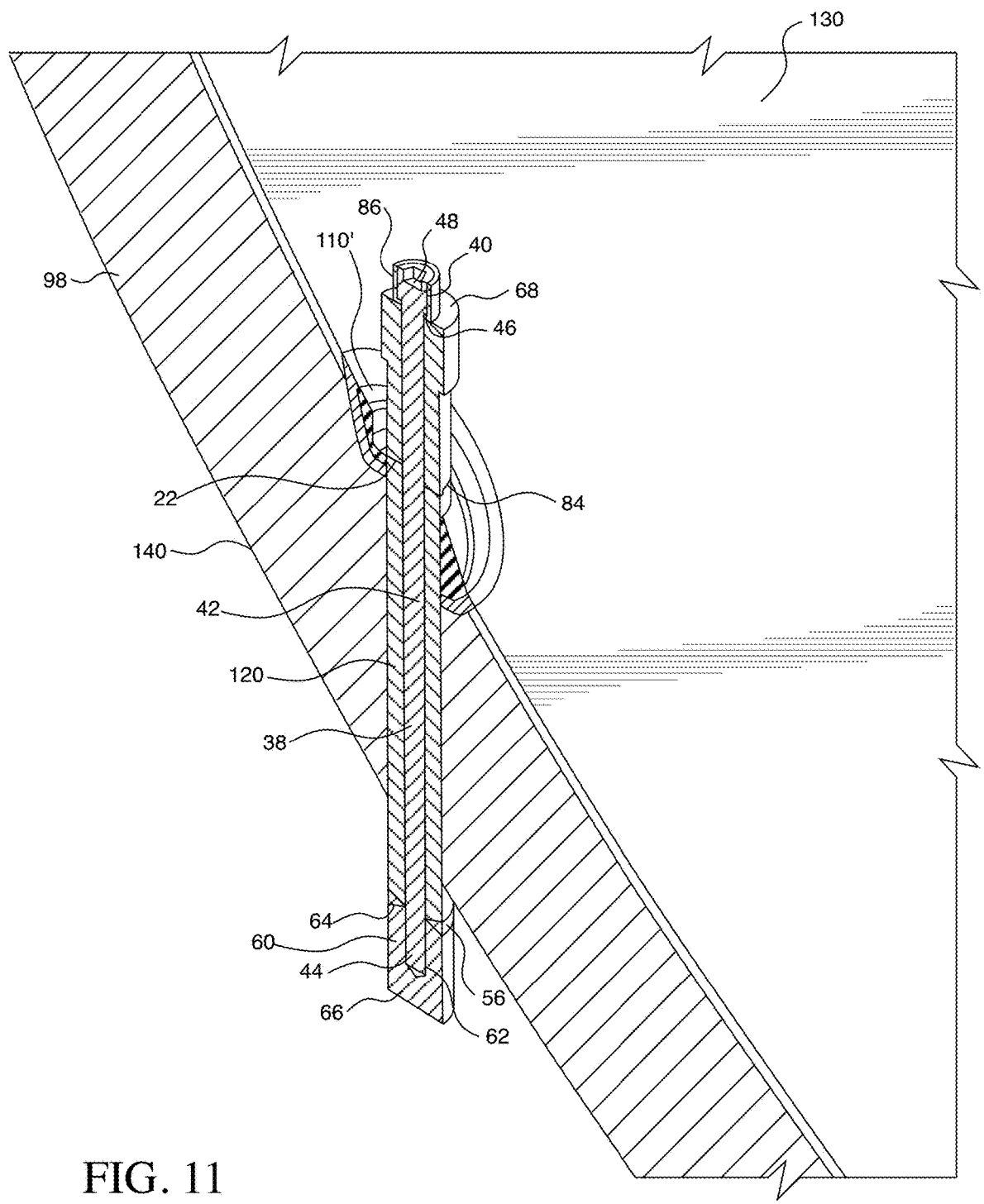
FIG. 11 is a section view of the embodiment of the anti-ejection device of FIG. 10 showing the device passing through the pressure vessel.
Figure 12:
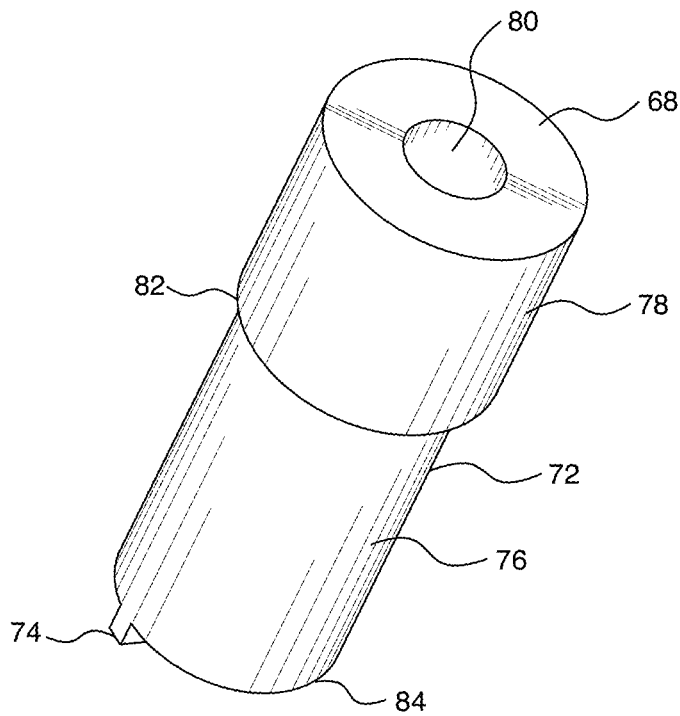
FIG. 12 illustrates the anti-ejection collar of the anti-ejection device of FIGS. 10 and 11.
Figure 13:
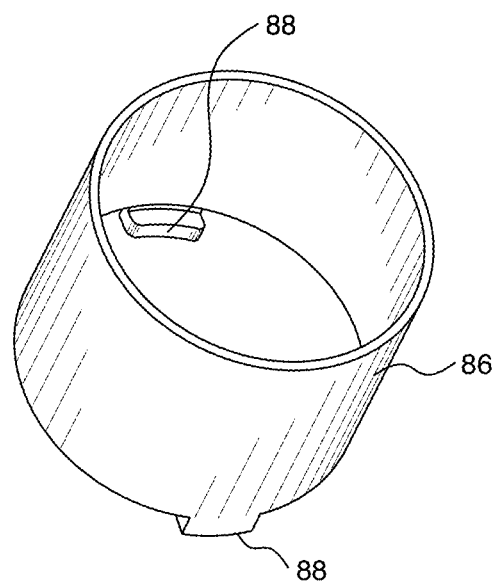
FIG. 13 illustrates an alternative embodiment of a locking cup to be seated on top of the collar of FIG. 12.

A lumen 80 extends through the center axis of collar 72 and aligns with axis 94 of lumen 92 of remnant 120 when the bottom surface 84 of collar 72 rests on the top surface 22 of remnant 120. Key 74, or any other suitable anti-rotation member, is sized for complementary mating engagement with notch 20 or any other suitable anti-rotation member. For example, in the embodiment shown, key 74 is sized to be received in notch 20 of remnant 120 to constrain collar 72 and remnant 120 against relative rotation about axis 94. Unlike lumen 26 of collar 12, lumen 80 of collar 72, as shown in FIG. 11, is uniform in cross-section along its length.

An optional locking cup 86 may be positioned on top surface 68 of collar 72 and is preferably welded in place to prevent the connector, such as bolt 38, from backing out.

Bolt 38 is inserted, in use, into lumens 80 and 92. Bolt head 40, rather than being seated in a recess within collar 72 as in collar 12, rests either on the top surface 68 of collar 72 or within locking cup 86. The lower rim 46 of bolt head 40 rests on the upper rim 68 of collar 72, or if locking cup 86 is used, may rest on tabs 88 on locking cup 86. Tabs 88 on locking cup 86 extend inwardly towards axis 94 from the lower edge of locking cup 86 and act as a washer between surface 68 of collar 72 and the under surface 46 of bolt head 40. The threaded end 44 of bolt 38 extends outwardly to the exterior 140 of the pressure vessel 98 and end cap 60 is threaded onto the threaded end 44 of bolt 38, as previously described. A weld 56 is preferably used to further secure end cap 60 to the bottom end 24 of remnant 120.

Locking cups 50 and 86 may be formed from a metal, such as stainless steel. Bolt 38, end cap 60 and collars 12 and 72 may be formed from stainless steel, or a Ni Cr alloy, or any other suitable material that will tolerate the high pressure, high temperature, and chemical environment and securely connect the anti-ejection device 10 and end cap 60 to the remnant 120.

The anti-ejection device and sealed end cap described herein are capable of maintaining the pressure boundary around a tube penetrating a pressure vessel 98. The anti-ejection device 10 causes the device to lodge into the pressure boundary which would prevent the device from becoming a projectile in the event of a connection failure. The anti-ejection device mitigates the possibility of the loss of large amounts of reactor coolant in a nuclear reactor. Although some coolant may be lost, the rate of loss will be slowed considerably, allowing time for corrective action.

The invention is being designed for use on a reactor vessel bottom mounted instrumentation tube. The invention could also be used for other pressure boundary penetration tubes where an anti-ejection feature is required.

The concept is, after cutting off portions of the existing penetration tube from both inside and outside of the pressure boundary, a threaded interface will be welded to the tube remnant outside of the pressure boundary. The new anti-ejection device, located on the inside of the pressure boundary, will be bolted on to the threaded interface. In order to prevent the bolt from backing out, an integral crimping cup may be incorporated into the design. In order to perform in-service inspections, the anti-ejection device, excluding the threaded end cap at the base of the design, will be removable.

Figure 14:
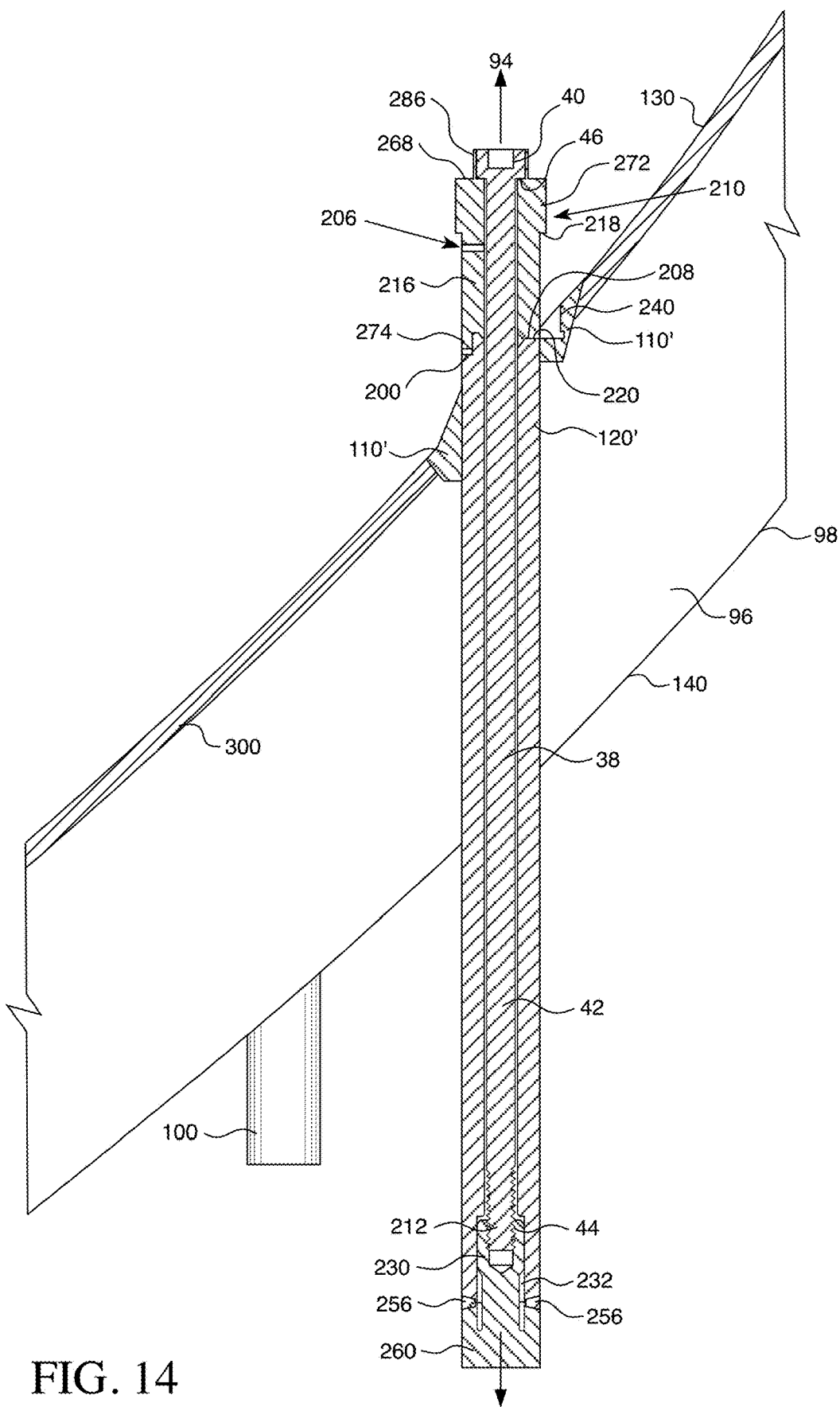
FIG. 14 illustrates a section view of an alternative embodiment of an anti-ejection device showing the device passing through the pressure vessel.
Figure 15:
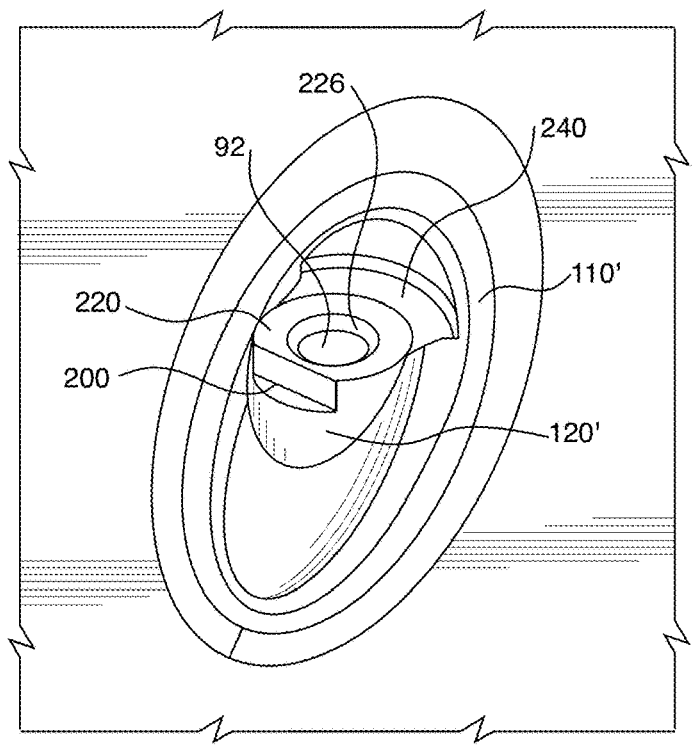
FIG. 15 is a perspective view of a portion of the instrument tube of FIG. 14 extending into the interior of a pressure vessel.
Figure 16:
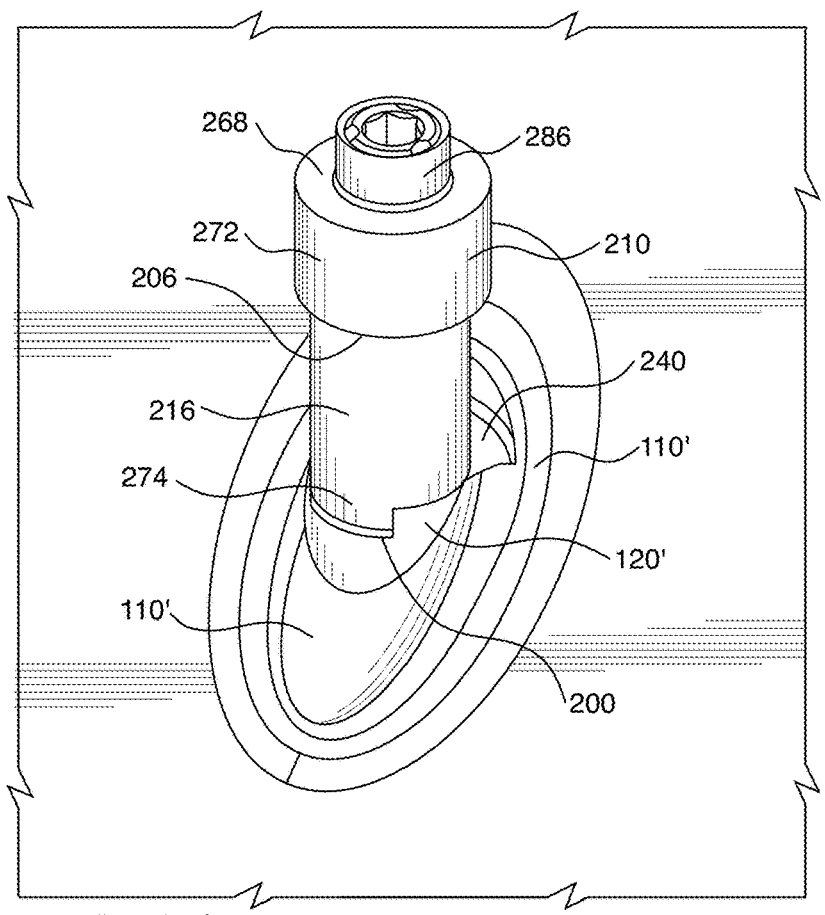
FIG. 16 is a perspective view of a portion of the anti-ejection device of FIG. 14, showing the portion of the device on the interior of a pressure vessel.
Figures 17, 18:
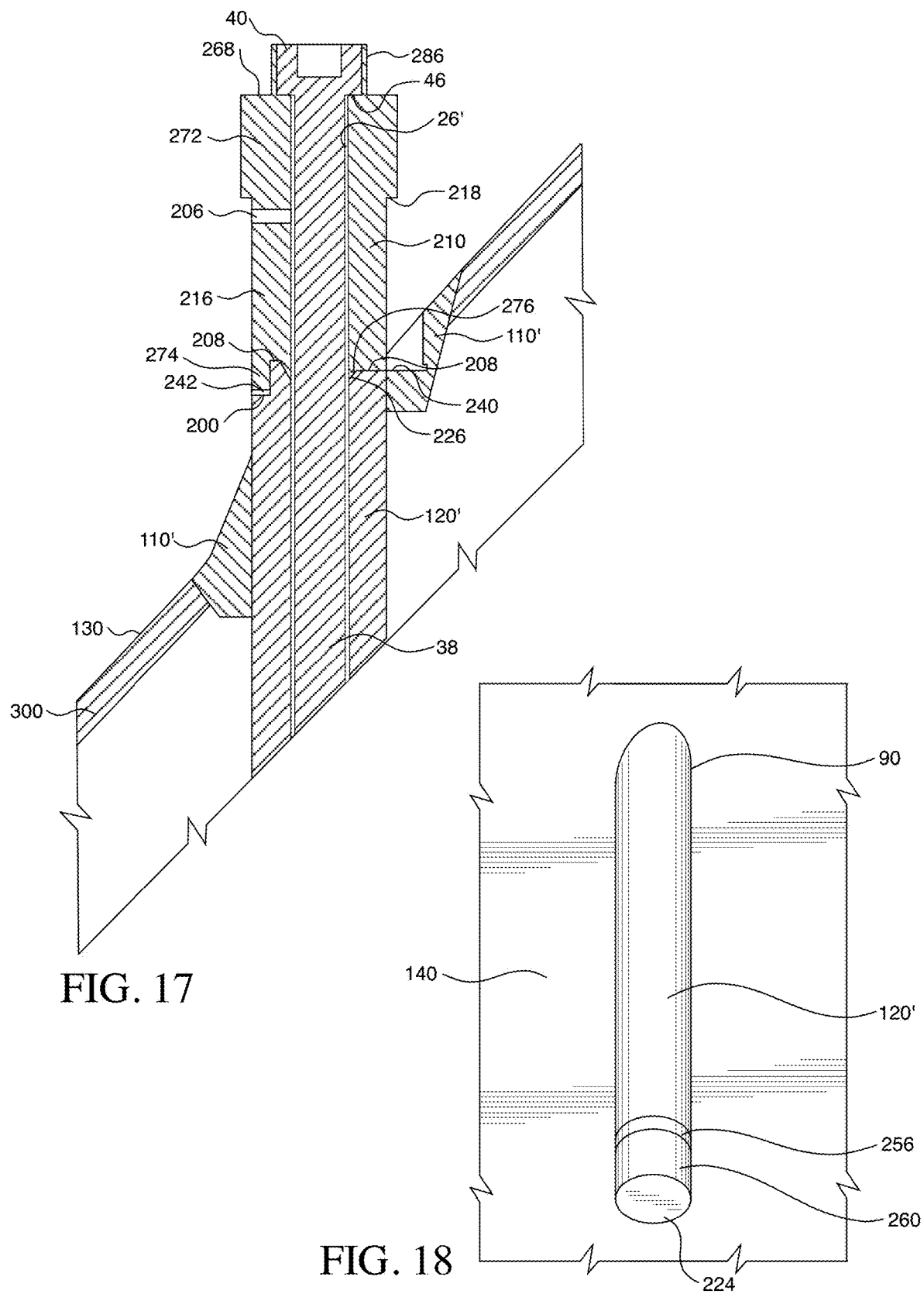
FIG. 17 is a section view of the portion of the anti-ejection device of FIG. 16.
FIG. 18 is a perspective view of a portion of the anti-ejection device of FIG. 14 extending through a pressure vessel to the exterior of the pressure vessel.

A further alternative embodiment of the anti-ejection device or collar is shown in FIGS. 14-20. FIG. 14 shows generally a cross-section of the remnant 120' of an original tube 100 with an anti-ejection device 210 mounted on the top of the remnant 120' in the interior 130 of a pressure vessel 98. The interior 130 of the pressure vessel 98 shown is lined with a cladding, such as stainless steel cladding 300. An end cap 260 is threaded onto a bolt 38 that extends through lumen 92 in remnant 120' to the exterior 140 of the pressure vessel 98 to join the anti-ejection device 210, remnant 120' and end cap 260 together. In the embodiment shown in FIGS. 14-20, when the original tube 100 is removed to form remnant 120', a notch 200 is cut into the surface 220 at the top of remnant 120' to form a mating surface, and a groove, such as a J-groove 240, is cut into the weld area at the juncture 110' around the interior side of hole 90 through the vessel wall 96 surrounding original tube 100. The J-groove 240, as shown in FIGS. 14 and 17, forms an area sufficiently large to allow the anti-injection device 210 and a suitable insertion tool (not shown) into the area for insertion of the anti-injection device 210.

The anti-injection device 210, as shown in FIGS. 14, 16 and 17, includes a neck portion 216 and a head portion 272. The transition between head portion 272 and neck portion 216 forms a surface 218, such as an annular surface, that will act as a stop to prevent the remnant 120' and anti-injection device 210 from being ejected from the vessel in the event of an accident.

The anti-injection device also includes an anti-rotation member. In the embodiment shown, the anti-rotation member is formed from a set of complementary surfaces. The lower rim 208 of neck portion 216 rests on the upper rim 220 of remnant 120'. The lower rim 208 has formed on one section thereof a projection, such as a tooth or key 274, that extends downwardly from rim 208 to form a first mating surface to abut, i.e., mate with, the second mating surface formed by notch 200 and together constrain relative rotation of the anti-ejection device 210 and the remnant 120'. Lower rim 208 also includes a bevel 276 formed around the opening of lumen 26' through anti-ejection device 210 that mates with a complementary beveled surface 226 at the upper rim 220 around the opening of lumen 92 through remnant 120', forming, respectively, third and fourth mating surfaces. The notch 200 cut into the surface 220 of the top of remnant 120' is configured to receive projection 274 to prevent rotation of the anti-ejection device 210 relative to remnant 120'. A small gap 242 in tooth 274 or notch 200 may, in various aspects, be included in the design to allow for differences in machine tolerances so that the complementary surfaces do not prevent lower rim 208 from resting on upper rim 220. Like the embodiment of the anti-rotation member shown in FIG. 3A, the positions of the projection and the notch may be reversed, wherein the projection extends from the interior upper rim 220 of the remnant 120' and the notch is cut into the lower rim 208 of the neck portion 216 of the anti-ejection device 210.

A ventilation hole 206 is formed in anti-ejection device 210 to allow pressure equalization and coolant flow to the bolt 38.

Figure 19:
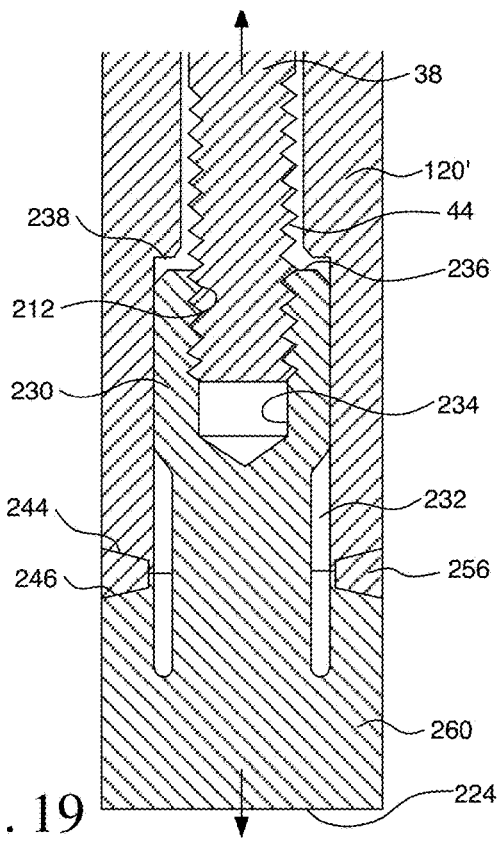
FIG. 19 is a section view of the portion of the anti-ejection device of FIG. 18.

Referring to FIGS. 18 and 19, an end cap 260 is shown for closing the bottom end 244 of remnant 120'. End cap 260 in various aspects, includes a bottom outer portion 224 and an internal portion 230. Bottom outer portion 224 is larger in diameter than internal portion 230 and forms a cavity, such as an annular cavity, therein from which internal portion 230 extends upwardly into lumen 92 of remnant 120'. A space between the interior of the annular cavity and internal portion 230 defines an annular gap 232 which, in various aspects, enables radiographic internal inspections of the remnant 120' and the pressure vessel 98. Bottom portion 224 has an upper rim 246 around the annular cavity.

Internal portion 230 includes, in various aspects, an upper section defining a cavity 234. The interior of cavity 234 includes threads 212 for engaging the threaded end 44 of bolt 38. The exterior of the walls of internal portion 230 that surround cavity 234 may be pressure fit against the interior walls of lumen 92. In various aspects, the bottom of remnant 120' may be machined to have a larger opening for receiving the internal portion 230 of end cap 260. The larger opening transitions at ledge 238 to the narrow opening of lumen 92 through which bolt 38 passes. The upper rim 236 of internal portion 230 abuts ledge 238 to stop internal portion 230 from advancing too far into remnant 120'. Internal portion 230 aligns bolt 38 within remnant 120' along longitudinal axis 94. Although not shown, instead of being held together at least in part by a pressure fit, in various aspects, the interior walls of lumen 92 in the larger opening may be threaded to engage complementary threads on the external surface of internal portion 230.

The end cap is welded to the bottom of remnant 120' by annular weld 256. The upper rim 246 of bottom outer portion 224 of end cap 260 and the lower rim of the bottom end 244 of remnant 120' are aligned, creating a ring-like groove at the juncture between the two components where the weld 256 is made.

When the anti-injection device 210 is placed on the top of remnant 120', the complementary surfaces of tooth 274 and notch 200 are mated. Before inserting bolt 38, a locking cup 286 (similar to locking cups 50 or 86) may be placed on the top rim of head portion 272 of anti-ejection device 210 around the opening to lumen 26' (see FIG. 17). The cup 286 may be welded to the rim of head portion 272. When bolt 38 is inserted through lumen 26' of anti-ejection device 210 and into the lumen 92 of remnant 120', the head 40 of bolt 38 fits into and rests in locking cup 286, which in various aspects, may thereafter be crimped to further secure the bolt in place.

End cap 260 may then be inserted into the open bottom, external end of remnant 120' and the threaded surfaces 44 and 212 engaged to align bolt 38 and secure end cap 260. The end cap 260 is then welded into place with, for example, annular weld 256.

When inserted, the end cap 260 is capable of maintaining the pressure boundary of the vessel wall 96. The lower rim 218 of the head portion 272 of anti-ejection device 210 will cause the device 210 to lodge into the pressure boundary in the event of an accident, which prevents the device from becoming a missile in the event of a connection failure. This feature also limits flow rate of reactor coolant and mitigates the possibility of a significant loss of reactor coolant out of the reactor vessel.

Figure 20:
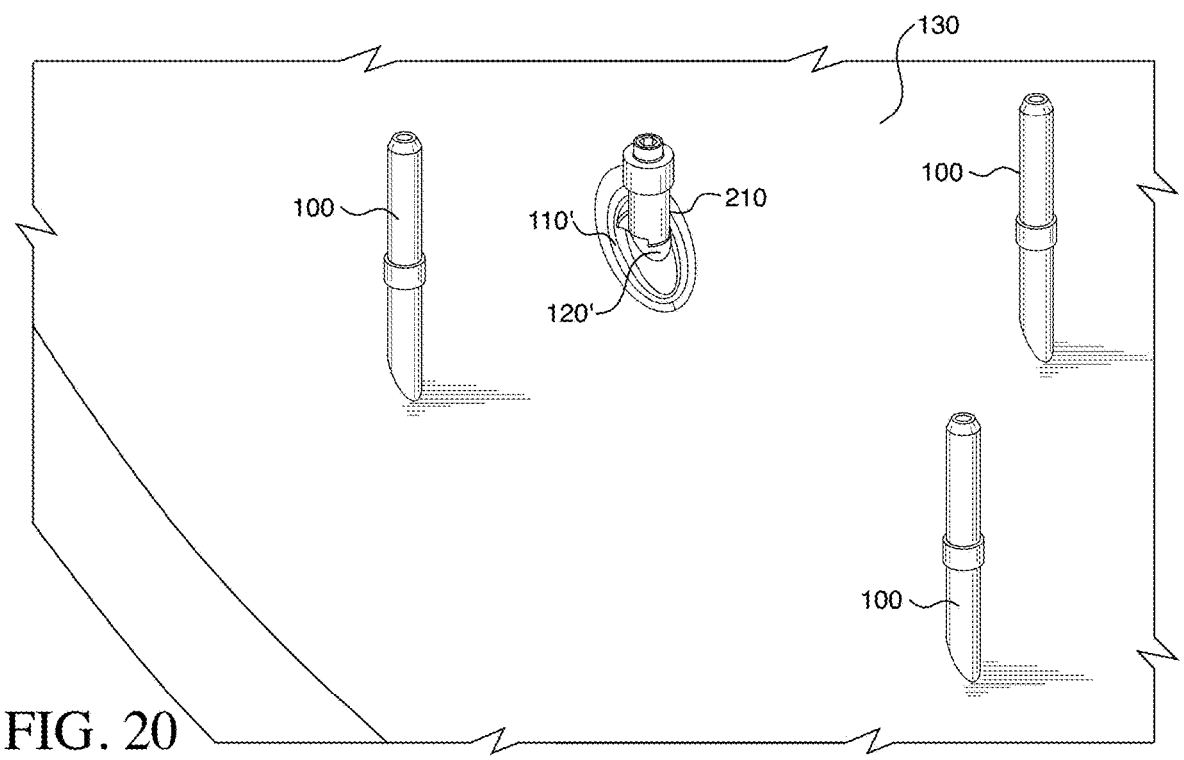
FIG. 20 illustrates a perspective view of the anti-ejection device of FIG. 14 and additional instrument tubes passing into the interior of a pressure vessel.

The anti-ejection device 210 allows removal of a defective tube 100 and restores the anti-ejection feature; thus, not compromising safety. As shown in FIG. 20, there may be several tubes 100 through a pressure vessel 98. It is useful to be able to selectively remove a defective tube without sacrificing the overall integrity of the pressure vessel 98 and uncompromised tubes 100.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A device for use in securing a remnant of a tube through a wall of a pressure vessel comprising:
    an anti-ejection device for attachment to the remnant on an interior side of the pressure vessel, wherein the anti-ejection device defines a lumen passing axially therethrough, wherein the remnant defines a lumen passing axially therethrough, and wherein the lumen of the anti-ejection device is configured for axial alignment with the lumen in the remnant;
    an end cap for attachment to the remnant on an exterior side of the pressure vessel for sealing an open end of the remnant; and
    a connector for passage through the lumen of the anti-ejection device and the lumen of the remnant, wherein the end cap defines an inner threaded channel axially aligned with the lumen of the anti-ejection device and the lumen of the remnant, wherein the connector comprises an elongate member having a threaded end for connection to the end cap.

2. The device recited in claim 1 wherein the anti-ejection device further comprises an anti-rotation member for constraining the remnant and the anti-ejection device against relative rotation therebetween.

3. The device recited in claim 2 wherein the anti-ejection device comprises an upper end and a lower end and the anti-rotation member comprises a first mating surface; and, the remnant has an upper end in the interior of the pressure vessel and a second mating surface formed in the upper end for complementary mating relationship with the first mating surface.

4. The device recited in claim 3 wherein the first mating surface comprises a projection extending from the lower end of the anti-ejection device; and,
    the second mating surface comprises a notch formed in the upper end of the remnant for complementary mating relationship with the projection.

5. The device recited in claim 3 wherein the first mating surface comprises a notch formed in the lower end of the anti-ejection device; and,
    the second mating surface comprises a projection extending from the upper end of the remnant for complementary mating relationship with the notch.

6. The device recited in claim 3 further comprising a third mating surface on the lower end of the anti-ejection device for complementary mating relationship with a fourth mating surface on the upper end of the remnant.

7. The device recited in claim 1 wherein the remnant is welded to the interior side of the pressure vessel to define a weld area.

8. The device recited in claim 1 wherein the elongate member is a bolt having an upper head portion, a mid-shank portion and a lower threaded end portion, the head portion being greater in cross-sectional dimension than the cross-sectional dimension of the shank portion.

9. The device recited in claim 8 wherein the lumen of the anti-ejection device defines an upper recessed section and a lower lumen section, the upper recessed section being greater in cross-sectional dimension that the cross-sectional dimension of the lower lumen section, the upper recessed section defining a rim surface for seating the head portion of the bolt.

10. The device recited in claim 8 wherein the lumen of the anti-ejection device is uniform in cross-section and the anti-ejection device defines an upper section defining a rim surface for seating the head portion of the bolt.

11. The device recited in claim 1 wherein the end cap comprises:
    a bottom end having an upper rim and defining an annular cavity therein; and,
    a top end extending upwardly from the annular cavity past the upper rim, and being configured for insertion into the lumen of the remnant, the top end defining a threaded cavity therein for engagement, in use, with the threaded end of the connector.

12. The device recited in claim 11 wherein, in use, the upper rim of the end cap is welded to the bottom end of the remnant.

13. The device recited in claim 1 further comprising a locking cup for securing the connector to the anti-ejection device.

14. The device recited in claim 13 wherein the anti-ejection device defines an upper rim and the locking cup is welded to the upper rim.

15. The device recited in claim 1 wherein the anti-ejection device is removable.

16. The device recited in claim 1 further comprising a ventilation hole formed in the anti-ejection device.

17. The device recited in claim 1 further comprising an anti-ejection stop member for preventing the anti-ejection device and remnant from being ejected from the pressure vessel in the event of a rupture thereof.

18. A device for use in securing a remnant of a tube through a wall of a pressure vessel comprising:

an anti-ejection device for attachment to the remnant on an interior side of the pressure vessel;

an end cap for attachment to the remnant on an exterior side of the pressure vessel for sealing an open end of the remnant;

further comprising a connector for connecting the anti-election device, the remnant, and the end cap;

wherein:

the anti-election device defines a lumen passing axially therethrough;

the remnant defines a lumen passing axially therethrough, the lumen of the anti-ejection device configured for axial alignment with the lumen in the remnant when, in use, the anti-ejection device is attached to the remnant;

the end cap defines an inner threaded channel axially aligned in use with the lumens of the anti-election device and the remnant; and, the connector comprises an elongate member for passage through the lumen of the anti-ejection device and the lumen of the remnant, and a threaded end for threaded connection to the channel of the end cap;

wherein the lumen of the anti-ejection device defines an upper recessed section and a lower lumen section, the upper recessed section being greater in cross-sectional dimension than the cross-sectional dimension of the lower lumen section, the upper recessed section defining a rim surface; and the device further comprises a locking cup seated on the rim surface of the upper recessed section for securing the connector to the anti-ejection device.

\* \* \* \* \*